United States Patent
Tu

(10) Patent No.: US 8,849,901 B2
(45) Date of Patent: Sep. 30, 2014

(54) SYSTEM AND METHOD FOR PRESENTING BUDDY LIST ON IM PLATFORM

(75) Inventor: Qiang Tu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 214 days.

(21) Appl. No.: 13/071,697

(22) Filed: Mar. 25, 2011

(65) Prior Publication Data

US 2011/0173257 A1     Jul. 14, 2011

Related U.S. Application Data

(63) Continuation of application No. PCT/CN2009/074374, filed on Oct. 14, 2009.

(30) Foreign Application Priority Data

Oct. 16, 2008 (CN) .......................... 2008 1 0216772

(51) Int. Cl.
    *G06F 15/16*          (2006.01)
    *G06F 3/00*            (2006.01)
    *H04L 12/58*          (2006.01)

(52) U.S. Cl.
    CPC .............. *H04L 12/581* (2013.01); *H04L 51/04* (2013.01)
    USPC ............................ 709/203; 709/207; 715/752

(58) Field of Classification Search
    CPC .............................. G06F 3/0484; G06F 15/173
    USPC ......................................................... 709/203
    See application file for complete search history.

(56) References Cited

U.S. PATENT DOCUMENTS

| | | | | |
|---|---|---|---|---|
| 8,200,755 | B2 * | 6/2012 | Fujimoto et al. | 709/204 |
| 2002/0035605 | A1 * | 3/2002 | McDowell et al. | 709/206 |
| 2007/0168443 | A1 | 7/2007 | Morgan | |
| 2008/0177875 | A1 * | 7/2008 | Denney et al. | 709/224 |
| 2008/0318655 | A1 * | 12/2008 | Davies | 463/16 |
| 2009/0049125 | A1 * | 2/2009 | Channabasavaiah | 709/204 |
| 2009/0113014 | A1 * | 4/2009 | Goldberg et al. | 709/207 |
| 2011/0264733 | A1 * | 10/2011 | Klassen et al. | 709/203 |
| 2013/0110735 | A1 * | 5/2013 | Lappin et al. | 705/321 |
| 2013/0117690 | A1 * | 5/2013 | Appelman | 715/752 |
| 2013/0144964 | A1 * | 6/2013 | Odell et al. | 709/206 |

FOREIGN PATENT DOCUMENTS

| | | | |
|---|---|---|---|
| CN | 1578952 | A | 2/2005 |
| CN | 101253752 | A | 8/2008 |
| CN | 101355528 | A | 1/2009 |
| CN | 101399785 | A | 4/2009 |

\* cited by examiner

*Primary Examiner* — Brian P Whipple
*Assistant Examiner* — James Edwards
(74) *Attorney, Agent, or Firm* — Harness, Dickey & Pierce, P.L.C.

(57) ABSTRACT

A system and method for presenting a buddy list on an IM platform are provided. The system includes an IM server and an IM client having a communication connection with the IM server. The IM server stores at least two of: a buddy database, a user information database and a status database. The buddy database records a buddy list of each user, the user information database records detailed information of each user, and the status database records a current status of each user. The IM client groups and sorts buddies in the buddy list according to the buddy list or detailed information of a buddy or a current status of the buddy obtained by the IM client from the IM server, and presents the buddy list according to a grouping and sorting result. Users are enabled to select different presenting manners and search for buddies conveniently.

15 Claims, 6 Drawing Sheets

| ∨ Ncuhome (6/13) | Capture screen Ctrl+ |
|---|---|

Benjamin WANG coderplay,former aol(http...

M qun-NcuHome nama

PENG-feel scared when others are greedy...

\*    Zhang | Somebody wants to travel? -.

ehom

Nana qaqa waterflier-Thunder 6 has an edition...

ww

A meng

Qinghua

∨ Classmates (6/20)

hrojiang82@hotmail.com-...

lisa:-Zhongke computer institue current graduate...

M qun-NcuHome

SYSTEM AND METHOD FOR PRESENTING BUDDY LIST ON IM PLATFORM

This is a continuation of International Application No. PCT/CN2009/074374 filed Oct. 14, 2009, which in turn claims the priority benefit of Chinese Patent Application No. 200810216772.3 filed Oct. 16, 2008, the entire respective disclosures of which are incorporated herein by reference.

FIELD OF THE INVENTION

The present invention relates to instant messaging (IM) technology, and particularly, to a system and method for presenting a buddy list on an IM platform.

BACKGROUND OF THE INVENTION

Web IM platforms are now popular among Internet users as an indispensable tool for communications. Fundamental data maintained by an IM platform is about a group of users whom a user cares about and who communicate directly with the user via instant messaging, and the group of users are referred to as the user's "buddies". As the time spent by the user in communicating via the IM platform increases, a large number of buddies may be accumulated in the user's buddy list, and an IM user terminal presents the buddies in a list form to the user. For an IM system, each buddy in a buddy list has the same position and importance with the others, and has no difference from the others. But the user may have different concerns for different buddies and may concern different aspects for different buddies, and the differences may have impact on a pattern adopted by the user to classify the buddies.

SUMMARY OF THE INVENTION

In view of the above, a system and a method for presenting a buddy list on an IM platform are provided, so that a user can freely and conveniently classify buddies and customize a presenting manner of a buddy list, and an IM client can present the buddy list with buddies arranged in various orders.

A system for presenting a buddy list on an IM platform includes an IM server, a plurality of IM clients connectable to the IM server for communication. The IM server includes a buddy database recording a buddy list for each user, a user information database recording detailed information of each user, and a status database recording a current status of each user. The IM client includes a grouping and sorting module which is adapted to group and sort buddies in a buddy list and a buddy list presenting module which is connected to the grouping and sorting module and is adapted to present the buddy list according to a grouping and sorting result from the grouping and sorting module. After a user logs on the IM server from an IM client, the IM server may update data in the buddy database, the user information database and the status database. Further, the user may query the buddy database, the user information database and the status database for the buddy list of the user, detailed information of a buddy of the user, and a status of the buddy of the user. The user may also instruct the grouping and sorting module to group and sort buddies in the buddy list based on the buddy list, detailed information of the buddies, or statuses of the buddies to make the buddy list presenting module present a buddy list processed through the grouping and sorting at the IM client of the user.

A method for presenting a buddy list on an IM platform includes:

recording, at an IM server, a buddy list for each user, detailed information of each user, and a current status of each user;

obtaining, by an IM client from the IM server after a user logs on the IM server from the IM client, the buddy list for the user, detailed information of a buddy of the user, and a current status of the buddy;

grouping and sorting, by the IM client according to an instruction of the user, buddies in the buddy list of the user based on the buddy list for the user, the detailed information of the buddy of the user or the current status of the buddy of the user;

presenting, by the IM client, the buddy list processed through the grouping and sorting.

The system and method for presenting a buddy list on an IM platform enable a user to choose different presenting manners according to different aspects concerned by the user about buddies, which facilitates the user to search for a buddy in the buddy list. Furthermore, the system and method has good extensibility, i.e., when a buddy list is required to be presented in a new manner according to a new feature, it is only needed to add data into the databases and perform another grouping and sorting.

BRIEF DESCRIPTION OF THE DRAWINGS

To make the technical solutions and merits thereof more apparent, detailed implementation of the present invention will be described hereafter with reference to the accompanying drawings.

Among the accompanying drawings.

DETAILED DESCRIPTION OF THE INVENTION

The present invention is further explained hereinafter in detail with reference to the accompanying drawings as well as embodiments so as to make the objective, technical solution and merits thereof more apparent. It should be understood that the embodiments herein are used only for explaining the present invention and shall not be used for limiting the protection scope of the present invention.

Figure 1:
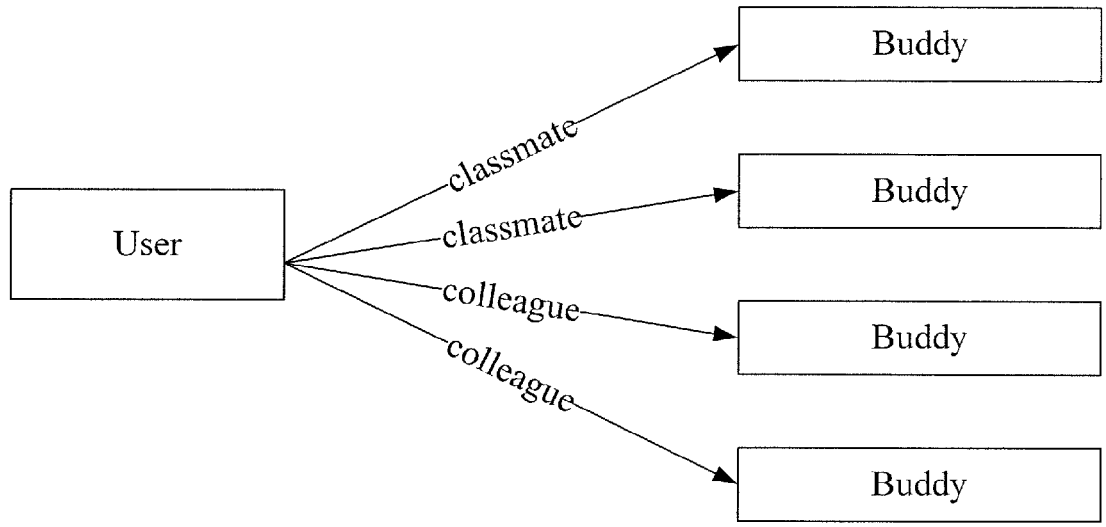
FIG. 1 is a schematic diagram illustrating conventional classification of IM buddies of an IM user according to natural quality of the IM buddies.

FIG. 1 is a schematic diagram illustrating conventional classification of IM buddies of an IM user according to natural quality of the buddies. Some users may adopt the manner shown in FIG. 1 to classify IM buddies according to the natural quality such as classmates or colleagues; some may classify IM buddies according to chatting frequency. Therefore, when a buddy list is to be presented on an IM user terminal, various factors should be taken into consideration for classifying and organizing buddies to help the user memorize the buddies and to increase the dependency of the user on the buddy list.

Figure 2:
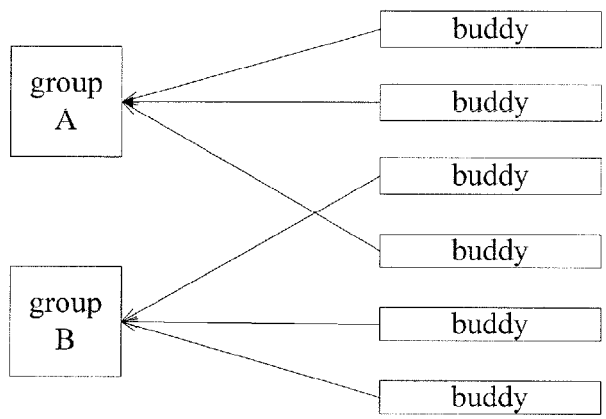
FIG. 2 is a schematic diagram illustrating a conventional manner for recording grouping of buddies of an IM user.
Figure 3:
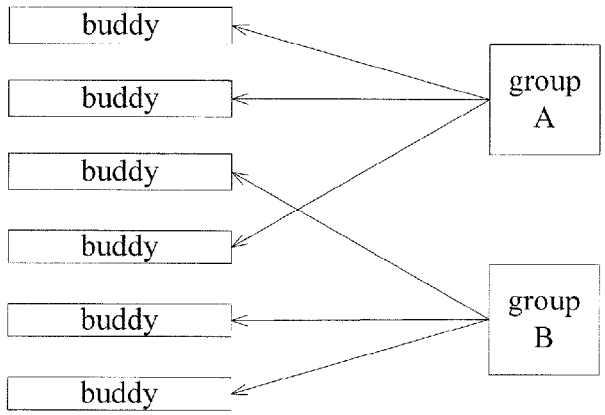
FIG. 3 is a schematic diagram illustrating a conventional manner for recording grouping of buddies of an IM user.

Considering different concerns of the user for the buddies, current IM platforms have put forward the concept of buddy grouping based on the buddy list. The user may divide buddies in the buddy list into several categories and designate a group attribute for each buddy according to the user's willingness. The groups defined by the user and buddies in each group are recorded in a database in a server. When the user logs on an IM client, the IM client may synchronize information of the groups with the server automatically so that the grouping remains consistent even if the user logs on the IM client from a different user terminal, a different location or a different circumstance. FIG. 2 and FIG. 3 respectively illustrate conventional manners for recording grouping of buddies of an IM user. Manner one, as shown in FIG. 2, includes adding an attribute to each buddy for recording which group the buddy belongs to, and each buddy belongs to one group. Manner two, as shown in FIG. 3, includes adding an attribute to each group for recording which buddies belong to the group, and each group includes a plurality of buddies. Manner two may result in a situation that one buddy belongs to two or more groups at the same time while manner one only permits a buddy to belong to a single group. Management of groups is much simpler for the user when manner one is adopted.

Figures 4, 5:
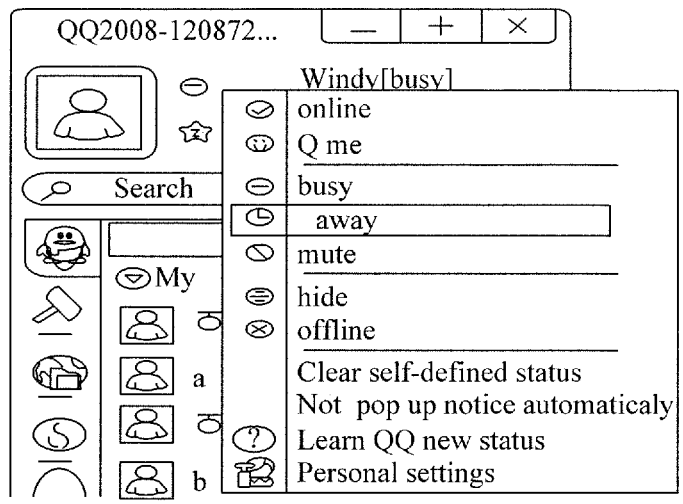
FIG. 4 is a schematic diagram illustrating several user statuses in conventional QQ.
FIG. 5 is a schematic diagram illustrating a conventional method for presenting a buddy list based on groups on an IM client.

Besides, buddies of an IM user may be classified into two categories according to statuses: online and offline, which is based on whether each buddy has logged on via an IM client or not. Taking a currently popular IM tool QQ as an example, FIG. 4 is a schematic diagram illustrating a few user statuses in conventional QQ. As shown in FIG. 4, the online category in QQ is further divided into sub categories including Q me, busy, away, mute and invisible. After logging on, a buddy may choose from the sub categories of the online category to represent his current status as well as whether he/she is willing to accept an IM conversation. Those sub categories and the offline category are referred to as statuses. For example, a buddy may choose the busy status when not willing to accept an IM conversation, or choose the invisible status when not willing to let others know he/she has logged on an IM client. Buddies in different statuses are presented in different manners in a buddy list.

In view of the foregoing, there is a method for presenting a buddy list according to groups as shown in FIG. 5. The method is implemented based on groups set up by a user and buddies designated to each group by the user. As shown in FIG. 5, the user firstly sets up two groups: "Ncuhome" and "classmates", and designates buddies for each of the two groups to make the IM client display the two groups separately. Whether each buddy is online or offline is specified by an icon preceding the username of the buddy. Further, since the manner of recording grouping of buddies shown in FIG. 3 is adopted, one buddy may appear in several groups, for example, the buddy named "M Qun-Ncuhome" in FIG. 5 is in two buddy groups at the same time.

As can be seen, one buddy may appear in multiple groups on the above IM platform for presenting a buddy list, which brings inconvenience to the grouping and management of buddies. Further, the presenting manner is fixed and can only present groups defined by users.

Figure 6:
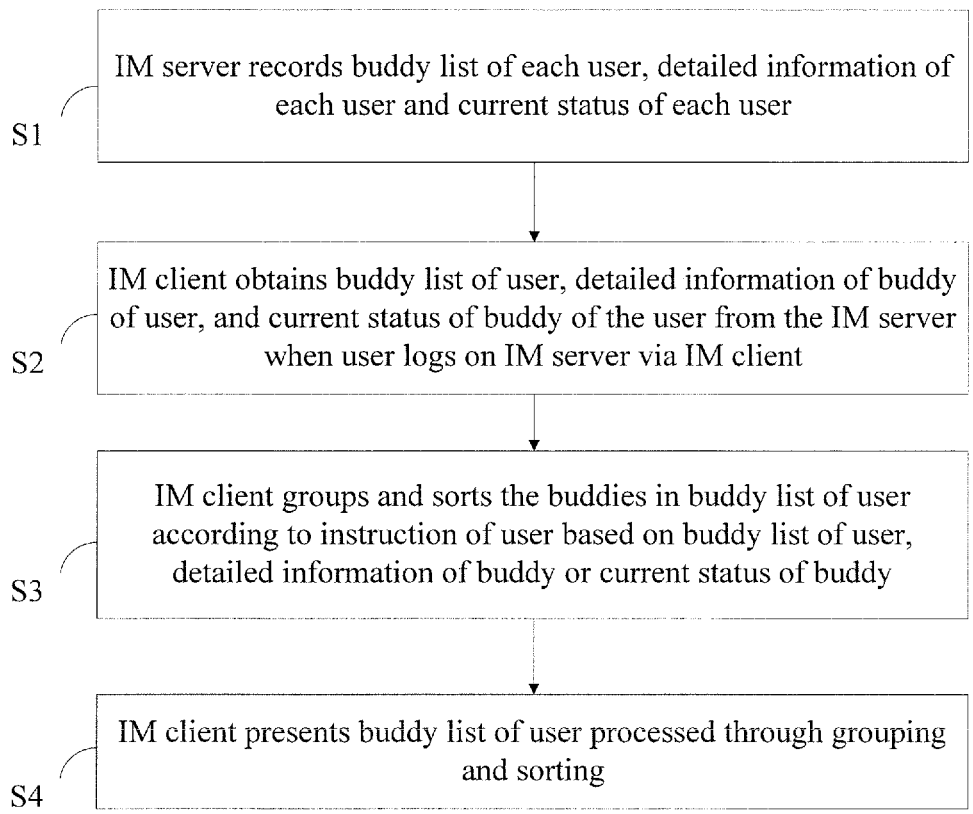
FIG. 6 is a flowchart illustrating a method for presenting a buddy list on an IM platform in accordance with an embodiment of the present invention.

In view of the foregoing, as shown in FIG. 6, which is a flowchart illustrating a method for presenting a buddy list on an IM platform in accordance with an embodiment of the present invention, the method for presenting a buddy list on an IM client operated by a user may include steps of: S1, recording, at an IM server, a buddy list of each user, detailed information of each user, a current status of each user; S2, obtaining, by the IM client from the IM server after the user logs on the IM server via the IM client, a buddy list of the user, detailed information of a buddy of the user and a current status of the buddy; S3, receiving, by the IM client, an instruction from the user for selecting a presenting manner, grouping and sorting buddies in the buddy list of the user based on the buddy list of the user, the detailed information of the buddy and the current status of the buddy; S4, presenting, by the IM client, the buddy list after grouped and sorted.

In S1, the buddy list may include a list of buddy identifications (ID) and configurations of the user for the buddies. The list of buddy IDs is a set of buddy IDs which are generated gradually during usage of the IM platform by the user who often utilizes the function of adding a buddy (or contact). The configurations for the buddies may include many aspects of information, such as grouping information of the buddies defined by the user, and information of a priority level defined by the user for each buddy. The detailed information of a user may include information, such as the latest logon time of the user, which another user may be interested in. The current status of a user may include online and offline statuses, such as busy, away, mute, invisible, etc. The conventional presenting of a buddy list is fixed, and can only present groups defined by users. But according to the embodiment, the IM server records more information in S1 which forms the basis for grouping buddies in a buddy list in a new way.

In S2, after logging on the IM server via the IM client, the user is able to obtain information of a buddy whom the user is interested in from the IM server. The information may include the buddy list, buddy groups defined by the user, the latest logon time of a buddy and the current status of a buddy. For convenience in processing, the information can be organized in a certain data structure, e.g., a relation database with the buddy IDs as a main keyword may be set up and each buddy ID may be associated with information including which group the buddy ID belongs to according to definitions of the user and the latest logon time of the buddy ID.

In S3, the user may choose a keyword which the user is interested in, and the IM client performs grouping and sorting of the information according to the keyword to form a new grouping manner of the buddy list. Besides groups defined by the user, the groups may also be formed based on the latest logon time of each buddy, the current status of each buddy and so on. For example, grouping by the logon time includes grouping and sorting buddy IDs according to the logon time of the buddies so that buddies logged on within a period of time forms a group. Through S3, the user may have the buddies grouped in a his/her preferred manner and have the groups or buddies in each group sorted, i.e., grouping buddies based on the buddy list, or based on the detailed information of the user such as groups defined by the user, the latest logon time of the buddies and/or the current statuses of the buddies, and then sorting the groups or buddies in each group based on the buddy list and/or the detailed information of the user and/or the current status of the user. Specifically, if the user is interested in a feature of buddies and data about the feature has been recorded by the IM server, the buddies can be grouped and sorted according to the feature, i.e. the keyword chosen by the user. If the data about the feature has not been recorded by the IM server, the user may add the feature into the configurations for the buddy list for the grouping, thus enriches the presenting manners of the buddy list. Thereby, there is expansibility of grouping presenting manners of a buddy list. In addition, due to the sorting operation, the grouping of buddies of the user can avoid grouping a buddy into multiple groups as in the prior art. Finally, the buddy list processed through the grouping and sorting in S3 is presented to the user by a user terminal in S4.

In addition, since the buddy list of each user, the detailed information of each user and the current status of each user may change, the buddy list and detailed information of a user recorded by the IM server will be updated each time the user logs on the IM server from an IM client, and the current status of the user recorded in the IM server will be updated in real time depending on operations performed by the user at the IM client, so as to keep those information accurate.

Figure 7:
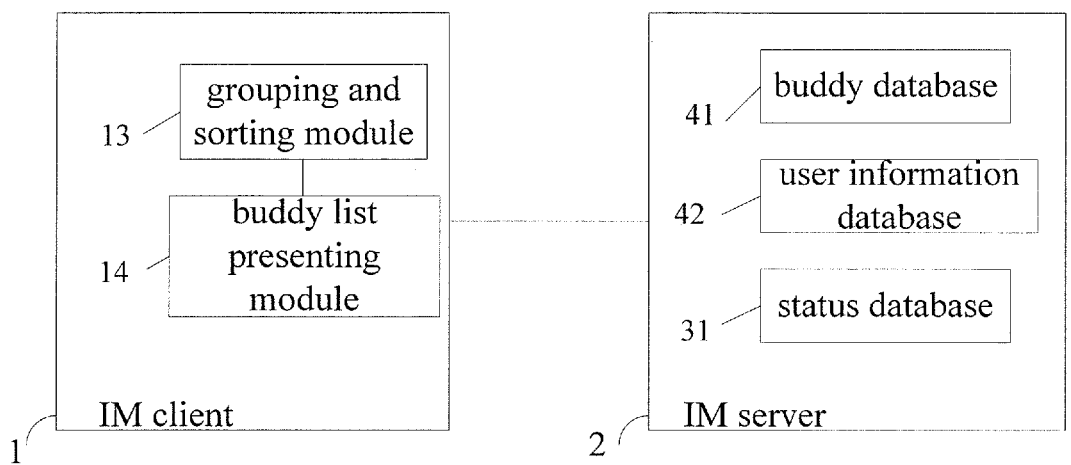
FIG. 7 is a schematic diagram illustrating a primary structure of a system for presenting a buddy list on an IM platform in accordance with an embodiment of the present invention.

FIG. 7 is a schematic diagram illustrating a primary structure of a system for presenting a buddy list on an IM platform in accordance with an embodiment of the present invention. As shown in FIG. 7, the system for presenting a buddy list on an IM platform includes an IM client 1 and an IM server 2. The IM server 2 includes a buddy database 41 recording a buddy list for each user, a user information database 42 recording detailed information of each user, and a status database 31 recording a current status of each user. The IM client 1 includes a grouping and sorting module 13 adapted to group and sort buddies in a buddy list, and a buddy list presenting module 14 which is connected to the grouping and sorting module 13 and is adapted to present the buddy list according to a result of the grouping and sorting from the grouping and sorting module 13. After a user logs on the IM server 2 via the IM client 1, the IM server 2 may update data relevant to the user in the buddy database 41, the user information database 42 and the status database 31. Further, the user may query the buddy database 41, the user information database 42 and the status database 31 for the buddy list, detailed information of a buddy and a status of the buddy. The user may also instruct the grouping and sorting module 13 to group and sort the buddies in the buddy list based on the buddy list, the detailed information of a buddy, and the status of the buddy, and then use the buddy list presenting module 14 to present, on the IM client 1 of the user, a buddy list processed through the grouping and sorting.

Figure 8:
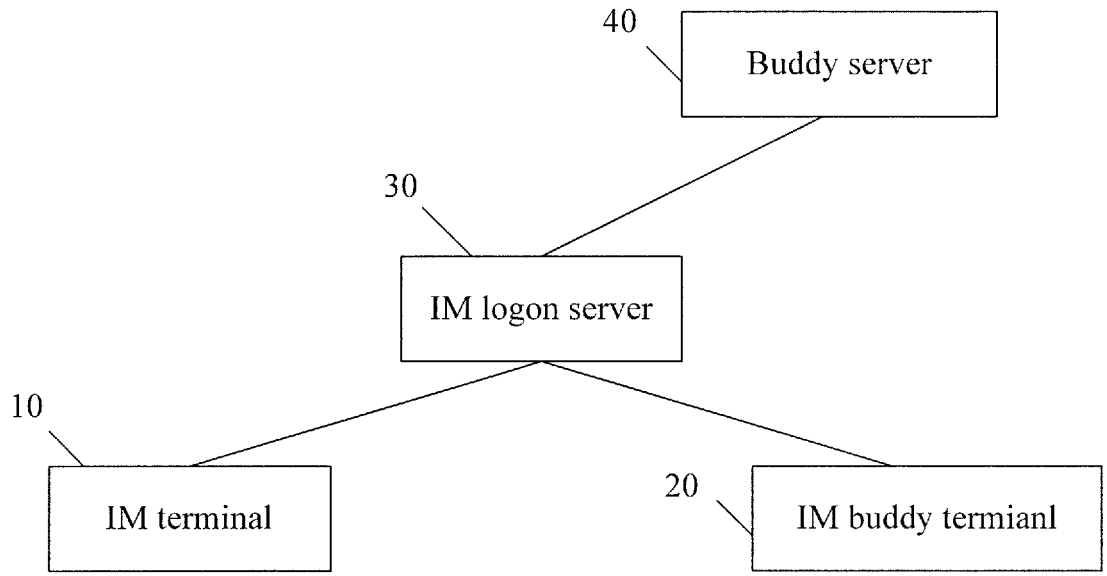
FIG. 8 is a schematic diagram illustrating a general structure of a system for presenting a buddy list on an IM platform in accordance with an embodiment of the present invention.

Refer to FIG. 8 to FIG. 11 each of which illustrates a structure of a system for presenting a buddy list on an IM platform in accordance with embodiments of the present invention. FIG. 8 is a flowchart illustrating a general structure of a system for presenting a buddy list on an IM platform in accordance with an embodiment of the present invention. The system in the embodiment mainly includes an IM logon server 30 of the user, a buddy server 40 which is directly connected to the IM logon server 30 and is adapted to store buddies of the user, an IM client connected to the IM logon server 30 and adapted to modify and present a buddy list. The IM client can be divided into an IM user terminal 10 and an IM buddy terminal 20 according to different processing aspects of the system. Different names of the user terminal and the buddy terminal are merely for differentiating the user and his buddy, but do not mean they are different in structures or functions. The IM buddy terminal 20 is a buddy in a buddy list of the IM user terminal 10. Operations of the IM buddy terminal 20 (e.g., logon, status modifications, etc.) may be reflected in the presenting of the buddy at the IM user terminal 10.

Figure 9:
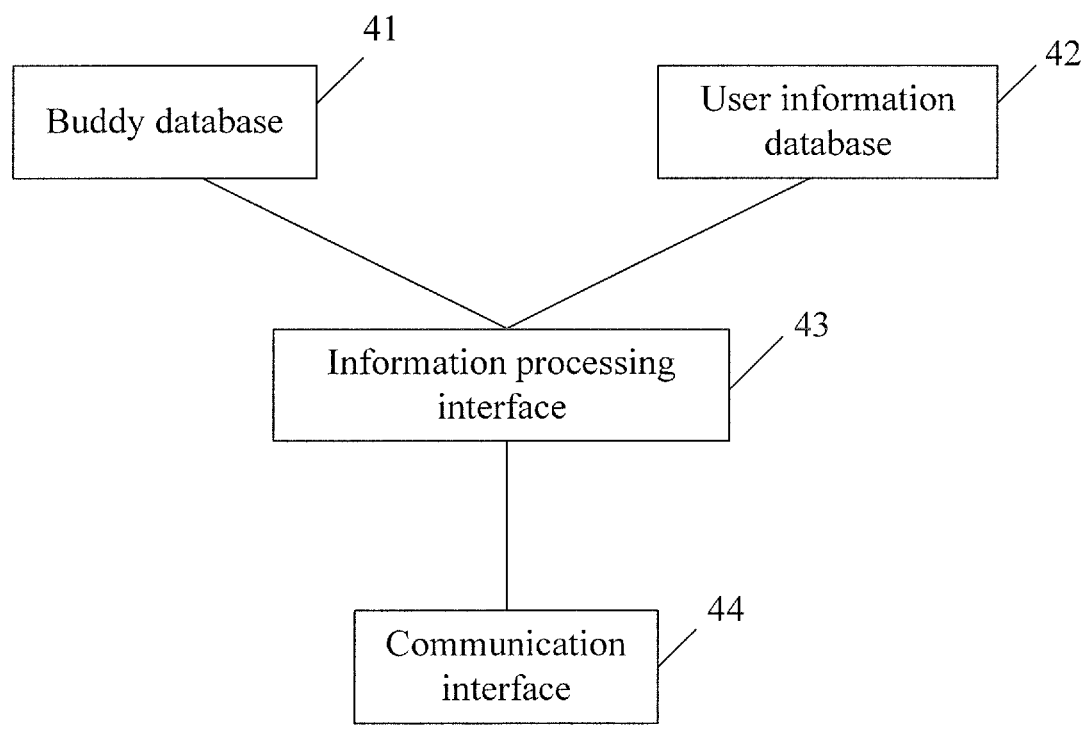
FIG. 9 is a schematic diagram illustrating a structure of a server in a system for presenting a buddy list on an IM platform in accordance with an embodiment of the present invention.

FIG. 9 is a schematic diagram illustrating a structure of a server in a system for presenting a buddy list on an IM platform in accordance with an embodiment of the present invention. The buddy server 40 includes a buddy database 41, a user information database 42, an information processing interface 43 connected to the two databases and adapted to classify and process access requests from external devices, and a communication interface 44 connected to the information processing interface 43 and adapted to perform communication with other modules via a network. The information processing interface 43 is adapted to: receive a request for querying for a buddy list forwarded by the IM logon server 30 via the communication interface 44; receive a request forwarded by the IM logon server 30 for modifying user logon data by the IM buddy terminal 20; search in the buddy database 41 for a buddy list of the IM user terminal 10, and search in the user information database 42 for the latest logon time of each buddy in the buddy list.

The buddy database 41 maintains a buddy list for each user. The buddy list includes IDs of the buddies and configurations for the buddies. The information processing interface 43 is adapted to return IDs of all users in the table after receiving a request for querying a buddy list. The user information database 42 is adapted to record detailed information of each user, such as the day of the last time when the user logs on the IM logon server 30. The data may be stored by utilizing a relational database. According to a common relational database, the buddy database may be as shown in the following Table 1.

TABLE 1

| user ID | serial number | buddy ID | group |
|---------|---------------|----------|-------|
| user 1  | buddy 2       | user 2   | group 1 |
|         | buddy 3       | user 3   | group 2 |
|         | ...           | ...      | ...   |

The user information database may be as shown in Table 2.

TABLE 2

| user ID | time of last logon | ... |
|---------|-------------------|-----|
| user 1  | 2008.1.1          | ... |
| user 2  | 2008.2.3          | ... |
| ...     | ...               | ... |

The buddy database 41 and the user information database 42 may be merged into one database as shown in Table 3.

TABLE 3

| ID     | time of last logon | buddy  | group   |
|--------|-------------------|--------|---------|
| user 1 | 2008.1.2          | user 2 | group 1 |
|        |                   | user 3 | group 2 |
| user 2 | 2008.2.3          | user 1 | ...     |
|        |                   | user 3 | ...     |
| user 3 | 2008.3.4          | ...    | ...     |
| ...    | ...               | ...    | ...     |

Figure 10:
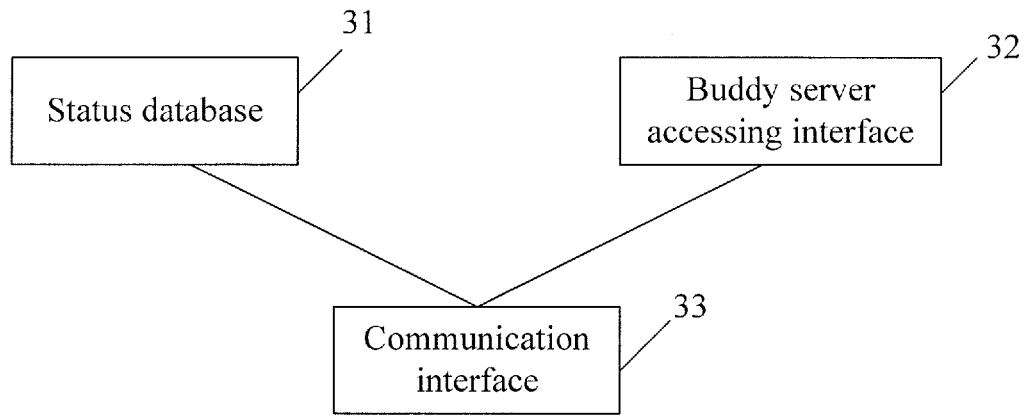
FIG. 10 is a schematic diagram illustrating a structure of a logon server in a system for presenting a buddy list on an IM platform in accordance with an embodiment of the present invention.

FIG. 10 is a schematic diagram illustrating a structure of an IM logon server in a system for presenting a buddy list on an IM platform in accordance with an embodiment of the present invention. The IM logon server 30 includes a buddy server accessing interface 32 for accessing the buddy server 40, a status database 31 for recording the current status of a user, and a communication interface 33 connected to the IM user terminal 10 and the IM buddy terminal 20. When the IM buddy terminal 20 switches to a new status, the information is delivered to the status database 31 via the communication interface 33. The status database 31 modifies a record of the status corresponding to the user ID in the database. When the IM user terminal 10 queries the IM logon server 30 for the status of a buddy, the communication interface 33 queries the status database 31 and returns the status data of the buddy to the IM user terminal 10. When the IM user terminal 10 queries for a buddy list, the communication interface 33 forwards the request to the communication interface 32 for accessing the buddy server 40 to query the buddy database 41. When the IM logon server 30 receives a logon request from the IM user terminal 20, the IM logon server 30 sends a request to the buddy server 40 to record the logon time of the IM user terminal 20 into the user information database 42.

Figure 11:
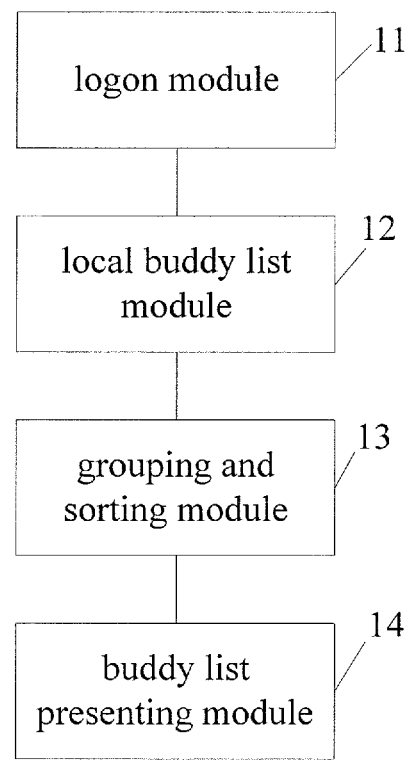
FIG. 11 is a schematic diagram illustrating a structure of an IM client in a system for presenting a buddy list on an IM platform in accordance with an embodiment of the present invention.

FIG. 11 is a schematic diagram illustrating a structure of an IM client in a system for presenting a buddy list on an IM platform in accordance with an embodiment of the present invention. The IM client 1 includes a logon interface 11 for sending a request to and receiving a response from the IM logon server 30, a local buddy list module 12 for caching a buddy list in the IM client 1, a grouping and sorting module 13 for grouping and sorting buddies in the buddy list, a buddy list presenting module 14 for outputting a result generated by the grouping and sorting module 13 to a screen of the user to display the buddy list. After the user logs on via the IM user terminal 1, the IM user terminal 1 sends a request for obtaining a buddy list and grouping information to the IM logon server 30. The buddy server accessing interface 32 forwards the request to the buddy database 41. The IM user terminal 1 stores the obtained buddy list and grouping information in a local machine, sends a request for obtaining statuses and time of last logon of all buddies, and obtains a result from the status database 31 and the user information database 42 respectively.

Figure 12:
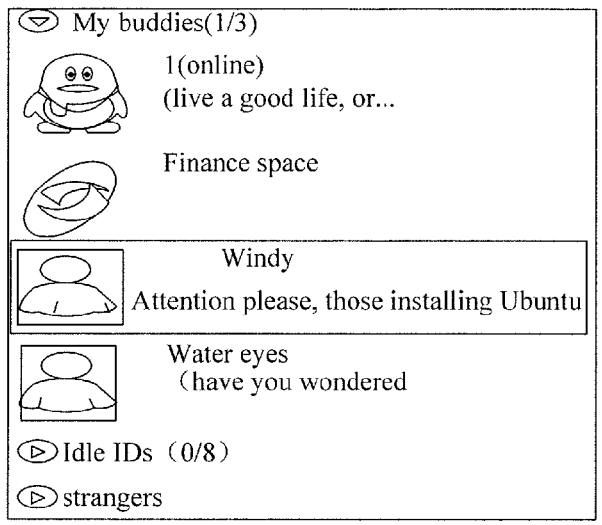
FIG. 12 is a schematic diagram illustrating a presenting manner customized by a user in a system for presenting a buddy list on an IM platform in accordance with an embodiment of the present invention.
Figure 13:
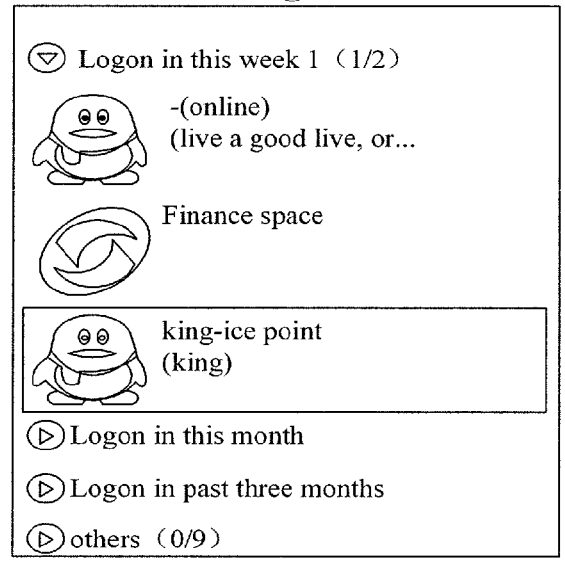
FIG. 13 is a schematic diagram illustrating a presenting manner according to the latest logon time of buddies in a system for presenting a buddy list on an IM platform in accordance with an embodiment of the present invention.
Figure 14:
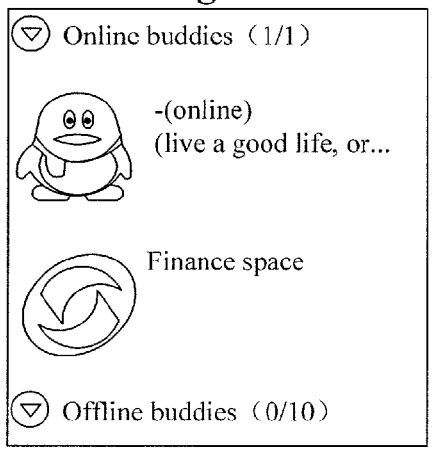
FIG. 14 is a schematic diagram illustrating a presenting manner according to buddy statuses in a system for presenting a buddy list on an IM platform in accordance with an embodiment of the present invention.

Through the above modules and procedures, the IM user terminal 10 obtains information including a buddy list, grouping information, statuses of buddies and time of last logon of the buddies. The grouping and sorting module 13 is adapted to group, sort and display the buddies based on the groups defined by the user, statuses of buddies and time of last logon of buddies respectively in any of three presenting manners according to an instruction of the user. The display effects of the three presenting manners, i.e. the mode based on groups defined by the user, the mode based on statuses of buddies, and the mode based on the time of last logon of buddies, are respectively shown in FIG. 12 to FIG. 14.

It should be appreciated that those skilled in the art can make modification and alteration to the present invention without departing from the technical scheme and the theory of the invention, thus the modification and alteration should be covered in the protection scope of the claims of the present invention.

What is claimed is:

1. A system for presenting a buddy list on an instant messaging (IM) platform, comprising an IM server and an IM client having a communication connection with the IM server; wherein
   the IM server is adapted to store at least two of a buddy database, a user information database and a status database;
   the buddy database is adapted to record a buddy list for each user;
   the user information database is adapted to record detailed information of each user;
   the status database is adapted to record a current status of each user;
   the IM client comprises a grouping and sorting module and a buddy list presenting module;
   the grouping and sorting module is adapted to group and sort buddies in the buddy list according to one of the buddy list of a user, detailed information of each buddy of the user and a current status of each buddy of the user obtained from the IM server when the IM client receives the user's selection from a first mode based on groups defined by the user, a second mode based on the current statuses of the buddies and a third mode based on the detailed information of the buddies; and
   the buddy list presenting module, having a communication connection with the grouping and sorting module, is adapted to present the buddy list of the user according to a grouping and sorting result from the grouping and sorting module;
   wherein the buddy list presenting module supports different presenting manners corresponding respectively to the first mode based on groups defined by the user, the second mode based on the current statuses of the buddies and the third mode based on the detailed information of the buddies, for presenting the buddy list of the user the IM client receiving a user's selection of one from a first presenting manner, a second presenting manner, and a third presenting manner,
   wherein when the user selects the third presenting manner, automatically grouping by the IM client the buddies in the third grouping manner comprise:
      grouping buddies logged on within a first period of time into a first group; and
      grouping buddies logged on within a second period of time into a second group,
   wherein presenting by the IM client the buddies in the third presenting manner comprises presenting the buddies in the first group and the second group on a screen.

2. The system of claim 1, wherein the detailed information of each user in the user information database comprises time of last logon of each user.

3. The system of claim 1, wherein, at least one of the buddy database and the user information database is a relational database.

4. The system of claim 1, wherein, the buddy database and the user information database are implemented by one database.

5. The system of claim 1, wherein
the IM server comprises an IM logon server and a buddy server having a communication connection with the IM logon server;
the IM logon server comprises a status database, a buddy server accessing interface for accessing the buddy server, and a first communication interface having a network connection with the IM client;
the buddy server comprises the buddy database and the user information database, an information processing interface connected with the buddy database and the user information database, and a second communication interface connected with the information processing interface;
the information processing interface is adapted to process a request forwarded by the second communication interface from external;
the second communication interface is adapted to maintain a network connection with other modules and receive the request from the external and forward the request to the information processing interface.

6. The system of claim 5, wherein the information processing interface is adapted to receive a request forwarded by the IM logon server from the IM client for obtaining a buddy list via the second communication interface, receive a request forwarded by the IM logon server from the IM client for modifying the detailed information of a user, receive a request forwarded by the IM logon server from the IM client for modifying a buddy list of a user; and
the information processing interface is further adapted to query the buddy database for the buddy list of the user, and query the user information database for detailed information of each buddy in the buddy list of the user.

7. The system of claim 5, wherein
the first communication interface is adapted to forward, when the user switches to a new status at the IM client, the new status of the user to the status database, the status database is adapted to modify the status of the user recorded in the database to the new status of the user;
the first communication interface is adapted to query the status database when the user requests to obtain a status of a buddy from the IM logon server via the IM client, and return the status of the buddy to the IM client;
the first communication interface is adapted to forward a request to the buddy server accessing interface when the user requests to obtain the buddy list of the user via the IM client, and query the buddy database;
the IM logon server is adapted to send a request to the buddy server for recording detailed information of the user into the user information database when receiving a logon request sent by the user via the IM client.

8. The system of claim 1, wherein the buddy list of the user comprises a list of buddy identifications (ID) and configurations for buddies in the list by a user.

9. The system of claim 1, wherein
the grouping and sorting module is adapted to group buddies according to one of the buddy list of the user, the detailed information of the buddy of the user and the current status of the buddy of the user obtained, sort buddy groups and/or buddies in each buddy group according to at least one of the buddy list of the user, the detailed information of the buddy of the user and the current status of the buddy of the user.

10. A method for presenting a buddy list on an instant messaging (IM) platform, comprising:
receiving by an IM client a user's selection of one from a first presenting manner, a second presenting manner, and a third presenting manner;
recording, at an IM server, a buddy list of each user, detailed information of each user, and a current status of each user;
obtaining, by an IM client from the IM server after a user logs on the IM server via the IM client, the buddy list of the user, detailed information of each buddy of the user, and a current status of each buddy of the user;
grouping and sorting, by the IM client when the IM client receives the user's selection from a first mode based on groups defined by the user, a second mode based on the current statuses of the buddies and a third mode based on the detailed information of the buddies, buddies in the buddy list of the user according to one of the buddy list of the user, the detailed information of each buddy of the user and the current status of each buddy of the user;
presenting, by the IM client, the buddy list of the user processed through the grouping and sorting, in one of different presenting manners corresponding respectively to the first mode based on groups defined by the user, the second mode based on the current statuses of the buddies and the third mode based on the detailed information of the buddies, according to the user's selection from the first mode based on groups defined by the user, the second mode based on the current statuses of the buddies and the third mode based on the detailed information of the buddies; wherein when the user selects the third presenting manner, automatically grouping by the IM client the buddies in the third grouping manner comprise:
grouping buddies logged on within a first period of time into a first group; and
grouping buddies logged on within a second period of time into a second group,
wherein presenting by the IM client the buddies in the third presenting manner includes presenting the buddies in the first group and the second group on a screen.

11. The method of claim 10, further comprising: updating, by the IM server each time the user logs on the IM server via the IM client, the buddy list of the user and the detailed information of the user; and updating, by the IM server, the current status of the user recorded in the IM server in real time according to an operation of the user at the IM client.

12. The method of claim 10, wherein the buddy list of the user comprises a list of buddy identifications (IDs) and grouping information defined by the user; the detailed information of the user comprises time of last logon of the user; and the current status of the user comprises an online status and an offline status.

13. The method of claim 12, wherein the grouping and sorting the buddies in the buddy list of the user comprises: grouping, sorting and displaying, by the IM client according to the selection of the user, buddies in the buddy list of the user according to one of the grouping information defined by the user, the time of the last logon of the buddies and the current statuses of the buddies.

14. The method of claim 10, wherein the grouping and sorting the buddies in the buddy list of the user comprises:
grouping the buddies according to one of the buddy list of the user, the detailed information of the buddy of the user and the current status of the buddy of the user obtained, and sorting buddy groups and/or buddies in each buddy group according to at least one of the buddy list of the user, the detailed information of the buddy of the user and the current status of the buddy of the user.

15. A method for presenting a buddy list on an instant messaging (IM) platform, comprising:
receiving by an IM client a user's selection of one from a first presenting manner, a second presenting manner and a third presenting manner;
automatically grouping by the IM client buddies in a buddy list of the user into different groups in one of a first grouping manner, a second grouping manner and a third grouping manner according to the user's selection of one from the first presenting manner, the second presenting manner and the third presenting manner;
wherein the first grouping manner is to group the buddies based on groups defined by the user and corresponding to the first presenting manner; the second grouping manner is to group the buddies based on current statuses of the buddies and corresponding to the second presenting manner; and the third grouping manner is to group buddies based on time of last logon of each buddy in the buddy list of the user and corresponding to the third presenting manner;
presenting by the IM client the buddies in one of the first presenting manner, the second presenting manner and the third presenting manner according to the user's selection of one from the first presenting manner, the second presenting manner and the third presenting manner;
wherein when the user selects the third presenting manner, automatically grouping by the IM client the buddies in the third grouping manner comprise:
grouping buddies logged on within a first period of time into a first group; and
grouping buddies logged on within a second period of time into a second group,
wherein presenting by the IM client the buddies in the third presenting manner comprises presenting the buddies in the first group and the second group on a screen.

\* \* \* \* \*